US012772364B2

(12) United States Patent
Moriya

(10) Patent No.: US 12,772,364 B2
(45) Date of Patent: Oct. 20, 2026

(54) X-RAY GENERATOR AND X-RAY INSPECTION APPARATUS INCLUDING THE SAME

(71) Applicant: ANRITSU CORPORATION, Kanagawa (JP)

(72) Inventor: Jyunichi Moriya, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 169 days.

(21) Appl. No.: 18/774,116

(22) Filed: Jul. 16, 2024

(65) Prior Publication Data

US 2025/0040021 A1 Jan. 30, 2025

(30) Foreign Application Priority Data

Jul. 24, 2023 (JP) ................................. 2023-119746

(51) Int. Cl.

| | |
|---|---|
| ***H05G 1/06*** | (2006.01) |
| ***G01N 23/04*** | (2018.01) |
| ***G01N 23/083*** | (2018.01) |
| ***G01N 23/18*** | (2018.01) |
| ***H05G 1/02*** | (2006.01) |

(52) U.S. Cl.

CPC ............... *H05G 1/06* (2013.01); *G01N 23/04* (2013.01); *G01N 23/083* (2013.01); *G01N 23/18* (2013.01); *H05G 1/025* (2013.01); *G01N 2223/204* (2013.01); *G01N 2223/643* (2013.01)

(58) Field of Classification Search

CPC ............ H05G 1/06; H05G 1/025; H05G 1/04; G01N 23/04; G01N 23/083; G01N 23/18; G01N 2223/204; G01N 2223/643

See application file for complete search history.

(56) References Cited

U.S. PATENT DOCUMENTS

2013/0114794 A1* 5/2013 Yamamoto ............... H05G 1/06 378/140
2014/0050305 A1 2/2014 Zhao et al.
2015/0371809 A1* 12/2015 Ding ........................ G21K 1/04 378/101

FOREIGN PATENT DOCUMENTS

CN 206775811 U * 12/2017
JP 2002-025792 A 1/2002
JP 2006-520068 A 8/2006

OTHER PUBLICATIONS

Translation of CN 206775811 U (Year: 2017).*

* cited by examiner

*Primary Examiner* — Uzma Alam
*Assistant Examiner* — Mamadou Faye
(74) *Attorney, Agent, or Firm* — McDonald Hopkins LLC

(57) ABSTRACT

There is provided an X-ray generator and an X-ray inspection apparatus including the same, which can achieve miniaturization and weight reduction. An X-ray tube that generates X-rays, a high-voltage circuit substrate that applies a high tube voltage to the X-ray tube, and a housing which is filled with an insulating oil and in which the X-ray tube and the high-voltage circuit substrate are accommodated, in which a shielding cover made of a shielding material which shields the X-rays is provided in the housing, the X-ray tube is disposed in the shielding cover, and the high-voltage circuit substrate is attached to an outer bottom surface of the shielding cover.

13 Claims, 9 Drawing Sheets

X-RAY GENERATOR AND X-RAY INSPECTION APPARATUS INCLUDING THE SAME

TECHNICAL FIELD

The present invention relates to an X-ray generator and an X-ray inspection apparatus including the same.

BACKGROUND ART

Patent Document 1 discloses an X-ray generation apparatus including an X-ray tube that generates X-rays, a high-voltage circuit substrate that applies a high voltage to the X-ray tube to heat a filament, and a tube container that encloses the X-ray tube and the high-voltage circuit substrate in an insulating oil, in which a lead plate for preventing leakage of the X-rays is attached to an inside of the tube container.

RELATED ART DOCUMENT

Patent Document

[Patent Document 1] JP-A-2002-25792

DISCLOSURE OF THE INVENTION

Problem that the Invention is to Solve

Meanwhile, in the X-ray generation apparatus disclosed in Patent Document 1, since the X-ray tube and the high-voltage circuit substrate having different sizes from each other are accommodated in the same tube container, there is an extra space in the tube container, so that the X-ray generation apparatus itself is enlarged.

In addition, since the lead plate having a large weight is attached to an inner front surface of the tube container to shield the X-rays, a weight of the X-ray generation apparatus itself is increased.

The present invention is made in consideration of the circumstances described above, and an object of the present invention is to provide an X-ray generator and an X-ray inspection apparatus including the same, which can achieve miniaturization and weight reduction.

Means for Solving the Problem

According to the present invention, there is provided an X-ray generator including: an X-ray tube that generates X-rays; a high-voltage circuit substrate that applies a high voltage to the X-ray tube; and a housing which is filled with an insulating oil and in which the X-ray tube and the high-voltage circuit substrate are accommodated, in which a shielding cover made of a shielding material which shields the X-rays is provided in the housing, the X-ray tube is disposed in the shielding cover, and the high-voltage circuit substrate is attached to an outside of the shielding cover.

With this configuration, in the X-ray generator according to the present invention, since the shielding cover consisting of the shielding material that shields the X-rays is provided in the housing, the X-ray tube is disposed in the shielding cover, and the high-voltage circuit substrate is attached to the outside of the shielding cover, the high-voltage circuit substrate can be efficiently disposed in the housing. In addition, by shielding a periphery of the X-ray tube with the shielding cover, a weight of the shielding material on an inner surface of the housing can also be reduced. Therefore, it is possible to reduce a size and a weight of the X-ray generator.

Further, in the X-ray generator according to the present invention, since the high-voltage circuit substrate is provided on the outside of the shielding cover, the high-voltage circuit substrate is not always exposed to the X-rays generated by the X-ray tube, and it is possible to prevent the high-voltage circuit substrate from deteriorating by the X-rays.

In the X-ray generator according to the present invention, the high-voltage circuit substrate may be attached to the shielding cover via an insulating leg member, and may be held at a position separated from the shielding cover by a predetermined distance, by the leg member.

With this configuration, in the X-ray generator according to the present invention, the high-voltage circuit substrate is attached to the shielding cover via the insulating leg member, and is held at a position separated from the shielding cover by the predetermined distance by the leg member, so that an insulation distance between the high-voltage circuit substrate and the shielding cover can be secured. Therefore, it is possible to prevent discharge between the high-voltage circuit substrate and the shielding cover.

In the X-ray generator according to the present invention, the housing may have one side surface which is open, and may have a lid body which closes an opening of the one side surface, the lid body may be formed with an X-ray window portion through which the X-rays generated by the X-ray tube pass, and the shielding cover and the X-ray tube may be attached to the lid body.

With this configuration, in the X-ray generator according to the present invention, since the shielding cover and the X-ray tube are attached to the lid body that closes the one side surface of the housing, and the high-voltage circuit substrate is attached to the outside of the shielding cover, a space for disposing the high-voltage circuit substrate in the lid body is not required, and the X-ray tube, the shielding cover, and the high-voltage circuit substrate can be simultaneously taken out from or accommodated in the housing in conjunction with attachment and detachment of the lid body of the housing. Therefore, it is possible to improve maintainability of the X-ray generator.

In the X-ray generator according to the present invention, the high-voltage circuit substrate may be attached to an outer surface of the shielding cover, on a side opposite to a lid body side.

With this configuration, in the X-ray generator according to the present invention, since the high-voltage circuit substrate is attached to the outer surface of the shielding cover on the side opposite to the lid body, in the housing, there is no need for a space for disposing the high-voltage circuit substrate on an outer peripheral surface of the shielding cover, which extends in a direction intersecting with the lid body, with the X-ray tube interposed therebetween. Therefore, a dimension of the housing can be reduced in a direction orthogonal to a direction in which the X-rays are emitted from the X-ray tube.

In the X-ray generator according to the present invention, the high-voltage circuit substrate may be attached to an outer peripheral surface of the shielding cover, which extends in a direction intersecting with the lid body.

With this configuration, in the X-ray generator according to the present invention, the high-voltage circuit substrate is attached to the outer peripheral surface of the shielding cover, which extends in the direction intersecting with the lid body, so that there is no need for a space for disposing the high-voltage circuit substrate on the outer surface of the shielding cover on the side opposite to the lid body in the housing.

Therefore, the dimension (height) of the housing can be reduced in a direction in which the X-rays are emitted from the X-ray tube.

In the X-ray generator according to the present invention, an insulating plate-shaped member may be disposed between the high-voltage circuit substrate and the shielding cover, and the high-voltage circuit substrate may be attached to the shielding cover via the plate-shaped member.

With this configuration, in the X-ray generator according to the present invention, since the high-voltage circuit substrate is attached to the shielding cover via the insulating plate-shaped member, which is disposed between the high-voltage circuit substrate and the shielding cover, insulation between the high-voltage circuit substrate and the shielding cover can be further improved.

According to the present invention, there is provided an X-ray inspection apparatus including: the X-ray generator according to the present invention; and an X-ray detector that detects the X-rays.

With this configuration, the X-ray inspection apparatus according to the present invention can reduce a size and a weight of the X-ray generator, and thus can reduce a size and a weight of the X-ray inspection apparatus.

Advantage of the Invention

According to the present invention, it is possible to provide an X-ray generator and an X-ray inspection apparatus including the same, which can achieve miniaturization and weight reduction.

BEST MODE FOR CARRYING OUT THE INVENTION

Hereinafter, an X-ray generator and an X-ray inspection apparatus according to an embodiment of the present invention will be described with reference to the drawings.

First Embodiment

An X-ray inspection apparatus including an X-ray generator according to a first embodiment of the present invention will be described with reference to FIGS. 1 to 4.

(Configuration of X-Ray Inspection Apparatus)

Figure 1:
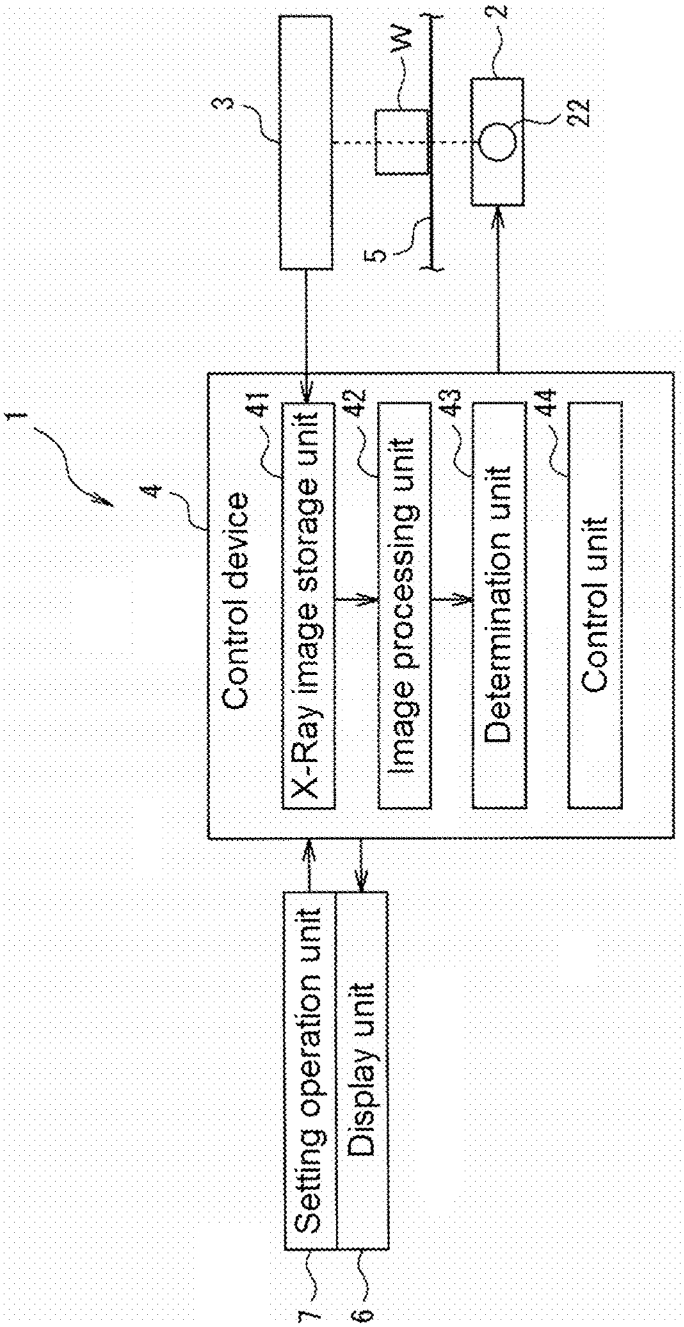
FIG. 1 is a schematic block diagram of an X-ray inspection apparatus including an X-ray generator according to a first embodiment of the present invention.

As illustrated in FIG. 1, the X-ray inspection apparatus of the present embodiment is an X-ray inspection apparatus that irradiates a transported inspection target object W with X-rays and inspects for foreign matter contamination, a shape, and the like in the inspection target object W by using a transmission image obtained by detecting the transmitted X-rays.

The X-ray inspection apparatus 1 according to the present embodiment includes a housing (not illustrated), an X-ray generator 2 that generates X-rays, an X-ray detector 3 that detects the X-rays transmitted through the inspection target object W, and a control device 4. The X-ray generator 2, the X-ray detector 3, and the control device 4 are accommodated in the housing (not illustrated).

The housing is incorporated into, for example, a conveyor 5 that transports the inspection target object W. The conveyor 5 is a part of a production facility of the inspection target object W, and is configured separately from the X-ray inspection apparatus 1. In the present embodiment, the embedded-type X-ray inspection apparatus 1 separately incorporated in the conveyor 5 will be described as an example. The X-ray inspection apparatus 1 according to the present embodiment is incorporated into, for example, the existing conveyor 5 that transports the inspection target object W in a horizontal direction, such as a top chain conveyor or a belt conveyor.

The X-ray generator 2 and the X-ray detector 3 are disposed to face each other in an up-down direction of the conveyor 5 across a transport path through which the inspection target object W on the conveyor 5 passes.

The X-ray generator 2 generates X-rays by irradiating a target of an anode with an electron beam from a cathode of an X-ray tube 22 provided at an inside of the X-ray generator 2, and emits the X-rays in a radial shape in a direction orthogonal to a transport direction of the inspection target object W as illustrated by a broken line in FIG. 1. Therefore, the X-ray generator 2 irradiates the inspection target object W on the conveyor 5, which is sequentially transported, with the X-rays.

The X-ray tube 22 is accommodated in a shielding cover 21, which will be described below, to prevent leakage of the X-rays. Further, the shielding cover 21 is accommodated in a housing 20, which will be described below. A detailed accommodation structure of the X-ray generator 2 will be described below.

The X-ray detector 3 includes a photodiode (not illustrated) and a plurality of X-ray detection elements (not illustrated) made of a scintillator provided on the photodiode. As the X-ray detector 3, for example, an area sensor in which X-ray detection elements are arranged side by side in a plane shape in a transport direction and a direction orthogonal to the transport direction, or a line sensor in which X-ray detection elements are arranged side by side in a line shape in the transport direction and a direction orthogonal to the transport direction can be used.

The X-ray detector 3 irradiates the inspection target object W with X-rays from the X-ray generator 2, and captures a transmission image of the X-rays, which are transmitted through the inspection target object W. Specifically, the scintillator of the X-ray detection element converts the X-rays into an optical signal, and the optical signal is converted into an electrical signal by the photodiode. Further, a process such as noise removal is executed to generate the transmission image with a density distribution based on the transmission amount of X-rays.

A display unit 6 and a setting operation unit 7 are connected to the control device 4.

The display unit 6 is configured with a flat display or the like, and performs a display and an output to a user. The display unit 6 is configured to display an image of an inspection result or the like by the control device 4.

In addition, the display unit 6 displays a determination result of defect or non-defect of the inspection target object W in characters or symbols such as "OK" or "NG". In addition, the display unit 6 displays statistical values such as the total number of inspections, the number of non-defective products, and the total number of NGs.

The display content and the display mode of the display unit 6 are determined based on default settings or a request from a setting operation unit 7 by operating a predetermined key.

The setting operation unit 7 is used to input settings of various parameters and the like to the control device 4. The setting operation unit 7 is configured with a plurality of keys, switches, and the like operated by the user, and is used to input settings of various parameters and the like to the control device 4 or select an operation mode.

In the present embodiment, the display unit 6 and the setting operation unit 7 are integrated as a touch panel type display device, and are disposed at a front surface upper portion of a housing (not illustrated).

The control device 4 includes an X-ray image storage unit 41, an image processing unit 42, a determination unit 43, and a control unit 44.

The X-ray image storage unit 41 stores an X-ray image received from the X-ray detector 3.

The image processing unit 42 executes an image process on the X-ray image read from the X-ray image storage unit 41 by applying various image processing algorithms and the like. Here, the image processing algorithm is configured with a combination of a plurality of image processing filters.

The determination unit 43 discriminates between the inspection target object W and a foreign matter with respect to the X-ray image on which the image process is performed by the image processing unit 42 to determine the presence or absence of the mixing of the foreign matter, and also determines defect or non-defect of a shape of the inspection target object W.

The control unit 44 includes a CPU, a memory as a storage region or a work region for control programs, and the like, and controls the entirety of the X-ray inspection apparatus 1. The control content of the control unit 44 includes controls of a display content and a display form of the display unit 6.

(Accommodation Structure of X-Ray Generator)

Figure 2:
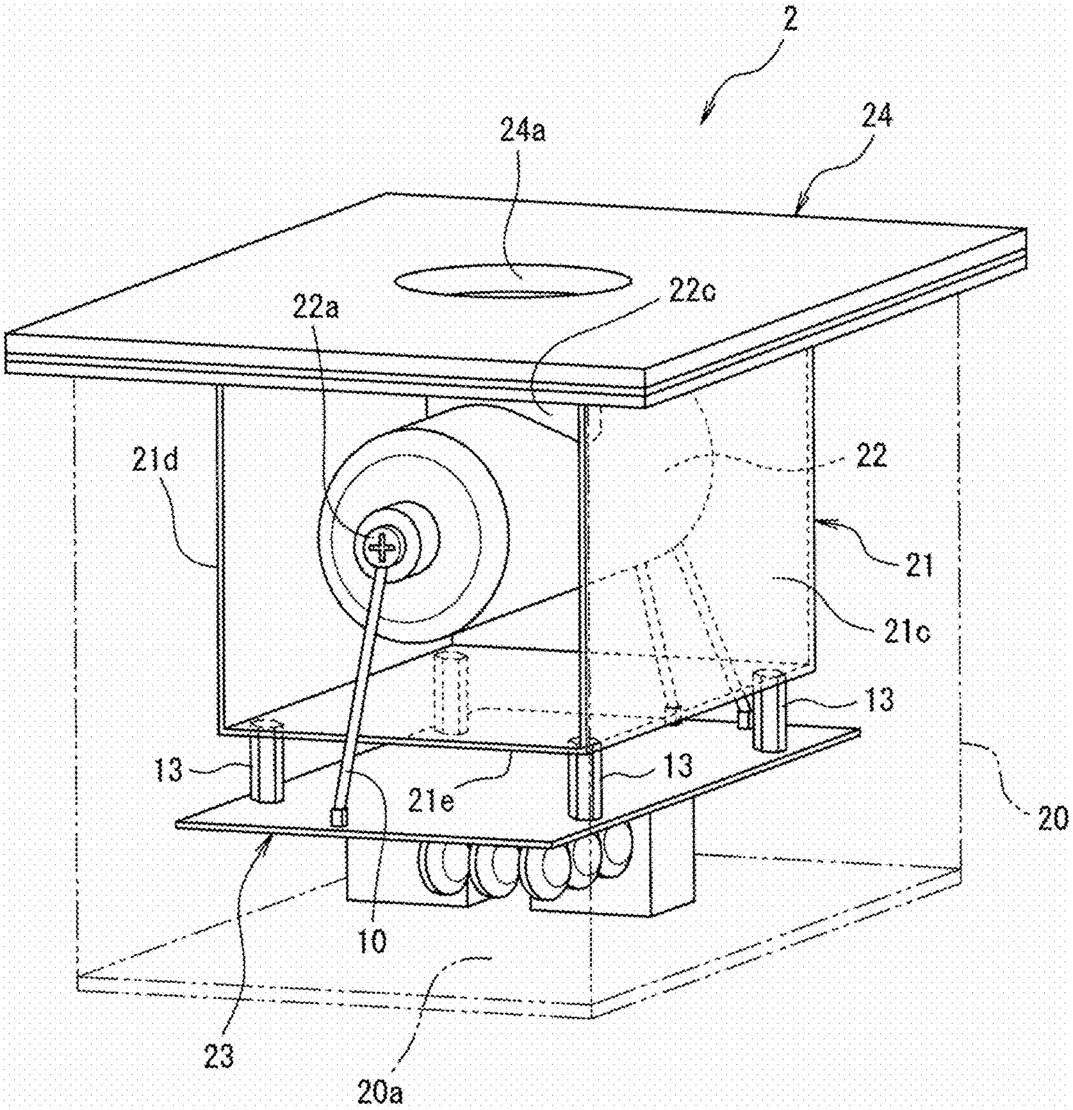
FIG. 2 is a transmission perspective-view of the X-ray generator according to the first embodiment of the present invention.

As illustrated in FIG. 2, the X-ray generator 2 includes the housing 20, the shielding cover 21, the X-ray tube 22, a high-voltage circuit substrate 23, and a lid body 24.

The housing 20 is made of, for example, stainless steel or iron, and has a box shape in which an upper surface as one side surface is open. An insulating oil (not illustrated) is filled inside the housing 20. It is preferable that the insulating oil is filled up to a height equal to or higher than a height at which at least a cathode and an anode of the X-ray tube 22, which will be described below, are immersed.

The insulating oil, for example, functions as a medium for cooling heat generated by the X-ray tube 22 during driving of the X-ray tube 22 while maintaining insulation between the X-ray tube 22, the shielding cover 21, and the housing 20.

Figure 3:
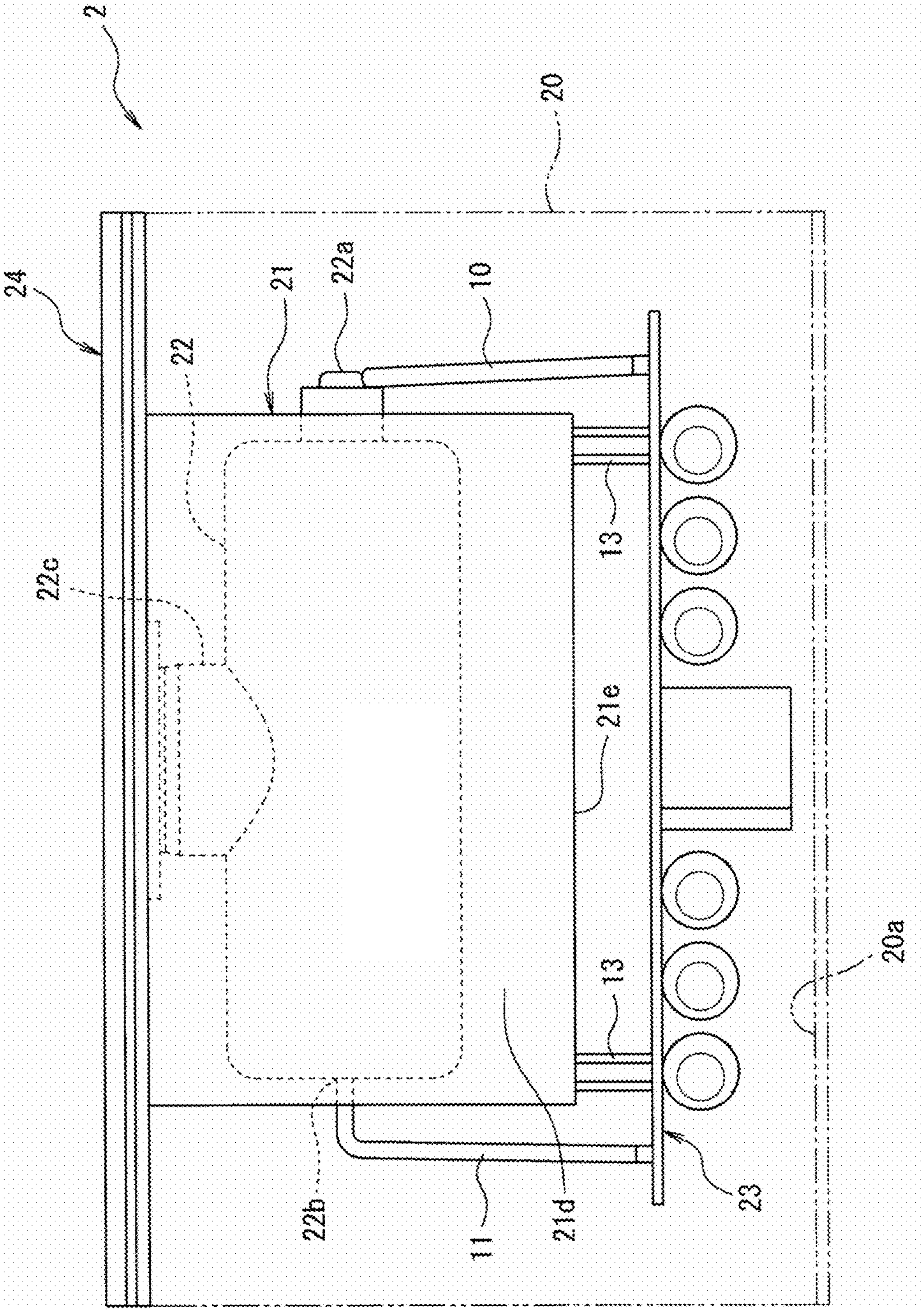
FIG. 3 is a transmission front view of the X-ray generator according to the first embodiment of the present invention.
Figure 4:
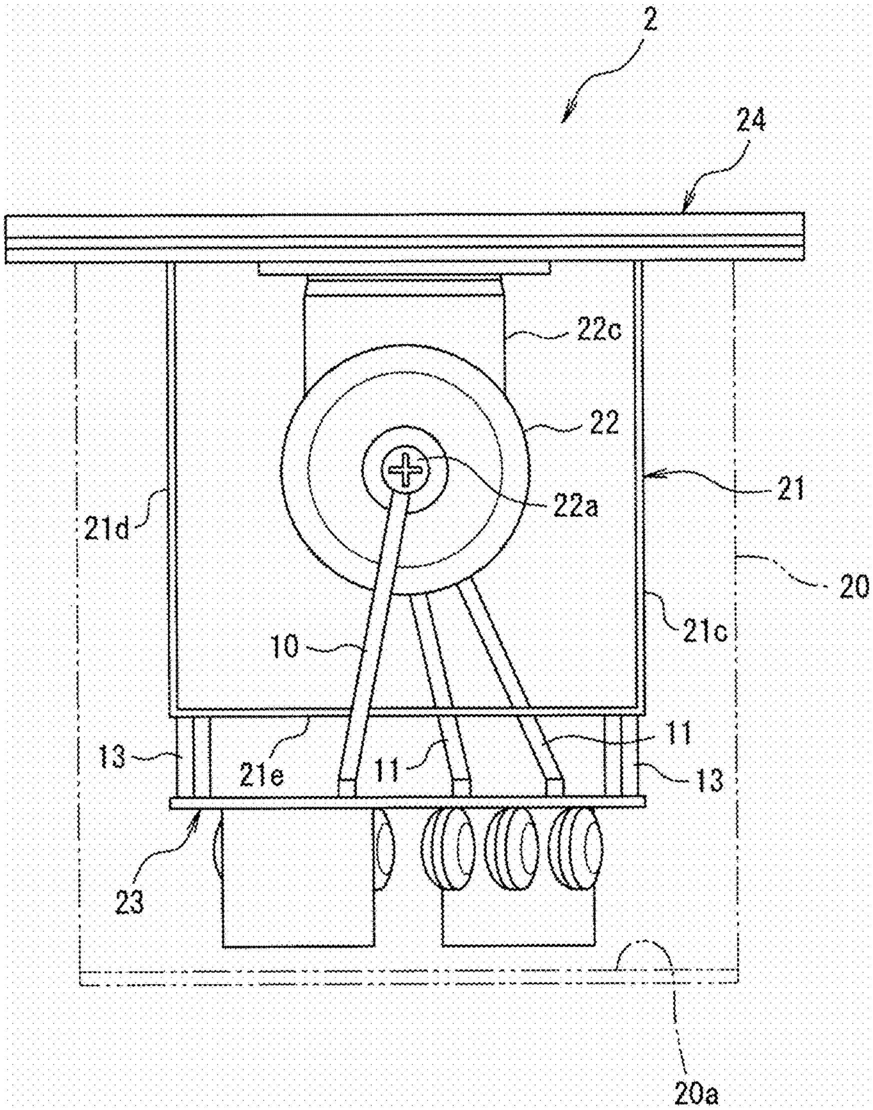
FIG. 4 is a transmission side view of the X-ray generator according to the first embodiment of the present invention.

As illustrated in FIGS. 3 and 4, the shielding cover 21 is formed to have small dimensions in the vertical, horizontal, and height directions with respect to the housing 20, and is accommodated inside the housing 20.

The shielding cover 21 is formed in a channel shape in which an upper surface and both sides of the X-ray tube 22 in the axial direction are open, and includes two outer side surfaces 21*c* and 21*d* that constitute an outer peripheral surface of the shielding cover 21 extending in a direction intersecting with the lid body 24 (up-down direction in the present embodiment), and an outer bottom surface 21*e* that constitutes an outer surface of the shielding cover 21 on a side opposite to the lid body 24.

An upper surface of the shielding cover 21 is bonded to a back surface of the lid body 24 by welding or a fastening member (not illustrated). Therefore, the shielding cover 21 is held by the lid body 24 in the housing 20, in a state in which the outer bottom surface 21*e* is spaced upward from the inner bottom surface 20*a* of the housing 20.

The shielding cover 21 is made of a shielding material that shields X-rays, and accommodates the X-ray tube 22 inside the shielding cover 21. For example, lead is used as the shielding material. The shielding cover 21 may be made of, for example, tungsten, and may be made of stainless steel or iron in a case where energy is low. Further, the shielding cover 21 may be made of a wall member made of stainless steel, iron, or a material other than the shielding material, with a shielding member such as lead attached inside.

Here, the X-ray tube 22 is applied with a high voltage, that is, a high tube voltage. Therefore, in the present embodiment, it is necessary to set a distance between the X-ray tube 22 accommodated in the shielding cover 21 and an inner surface of the shielding cover 21 (including a creepage distance) to a sufficiently large dimension according to the tube voltage such that discharge does not occur between the X-ray tube 22 and the shielding cover 21.

Therefore, in the present embodiment, a size of the shielding cover 21, that is, each dimension of a length, a width, and a height is set to a dimension with which a distance (including the creepage distance) is secured such that discharge does not occur between the X-ray tube 22 and the inner surface of the shielding cover 21.

The X-ray tube 22 is formed in a cylindrical shape, and a cathode is provided at an end portion on one side in an axial direction of the cylindrical shape (hereinafter, referred to as a "cathode-side end portion") 22*b*, and an anode is provided at an end portion on the other side (hereinafter, referred to as an "anode-side end portion") 22*a*, and a target made of tungsten or the like is provided on the anode. The X-ray tube 22 generates X-rays by applying a high tube voltage between the anode and the cathode to draw an electron beam from the cathode and to strike the target with the electron.

A lead wire 10 on an anode side is led out from the anode-side end portion 22*a*. The lead wire 10 is connected to the high-voltage circuit substrate 23. A lead wire 11 on a cathode side is led out from the cathode-side end portion 22*b*. The lead wire 11 is connected to the high-voltage circuit substrate 23.

An upper cylindrical portion 22*c* is provided on an upper portion of the X-ray tube 22. A lower end of the upper cylindrical portion 22*c* is connected to the X-ray tube 22 to surround an emission port of the X-rays. An upper end of the upper cylindrical portion 22*c* is fastened to the lid body 24 by a fastening member (not illustrated) surrounding an X-ray window portion 24*a*, which will be described below, of the lid body 24. Therefore, the X-ray tube 22 is held at a substantially central position of the shielding cover 21 in a posture in which the cylindrical axis is horizontal.

The X-rays emitted from the target during the driving of the X-ray tube 22 are emitted into an inside of the upper cylindrical portion 22*c* from the emission port provided on a peripheral surface of the X-ray tube 22, and are emitted to an outside from the X-ray window portion 24*a* of the lid body 24.

The high-voltage circuit substrate 23 is a circuit substrate that applies a high tube voltage to the X-ray tube 22. The high-voltage circuit substrate 23 is attached to an outer side of the shielding cover 21. Specifically, the high-voltage circuit substrate 23 is attached to the outer bottom surface 21*e* of the shielding cover 21 via four leg members 13.

Therefore, the high-voltage circuit substrate 23 is held by the four leg members 13 at a position separated from the outer bottom surface 21*e* of the shielding cover 21 downward by a predetermined distance. The leg member 13 is made of, for example, an insulating member such as a resin.

It is desirable that a predetermined distance between the high-voltage circuit substrate 23 and the outer bottom surface 21*e* of the shielding cover 21 is a distance (including a creepage distance) at which insulation can be maintained between the high-voltage circuit substrate 23 and the shielding cover 21. Therefore, it is preferable that a length of the leg member 13 in the axial direction of the present embodiment is set to a dimension corresponding to the distance at which the insulation described above can be maintained.

The number of leg members 13 is not limited to 4. In addition, as long as the high-voltage circuit substrate 23 can be held at the position separated from the outer bottom surface 21*e* of the shielding cover 21 by the predetermined distance in a downward direction, the attachment structure is not limited to the attachment structure using the leg member 13, and another attachment structure may be adopted.

In addition, it is desirable that the high-voltage circuit substrate 23 is held in the housing 20 at a position at which the high-voltage circuit substrate 23 can maintain insulation with respect to the housing 20. Therefore, in the present embodiment, it is preferable that a dimension of the housing 20 is set such that a distance between the housing 20 and the high-voltage circuit substrate 23 is a distance at which the insulation can be maintained.

The lid body 24 is a lid body that closes an opening of an upper surface of the housing 20, and is provided to be attachable to and detachable from the upper surface of the housing 20. The lid body 24 is fastened to the upper surface of the housing 20 by a fastening member (not illustrated) in a case where the opening of the housing 20 is closed.

The X-ray window portion 24*a* through which X-rays generated by the X-ray tube 22 pass is formed in the lid body 24. The X-ray window portion 24*a* is disposed at a substantially center of the lid body 24.

The shielding cover 21 and the X-ray tube 22 as described above are attached to the lid body 24. Therefore, when the lid body 24 is removed from the housing 20, the shielding cover 21 and the X-ray tube 22 are also taken out from the housing 20 together with the lid body 24.

Actions and Effects

In this manner, in the X-ray generator according to the present embodiment, since the shielding cover 21 consisting of a shielding material that shields X-rays is provided in the housing 20, the X-ray tube 22 is disposed in the shielding cover 21, and the high-voltage circuit substrate 23 is attached to an outside of the shielding cover 21, the high-voltage circuit substrate 23 can be efficiently disposed in the housing 20. In addition, by shielding the periphery of the X-ray tube 22 with the shielding cover 21, a weight of a shielding material on an inner surface of the housing can also be reduced. Therefore, it is possible to reduce a size and a weight of the X-ray generator 2.

Further, in the X-ray generator according to the present embodiment, since the high-voltage circuit substrate 23 is provided on the outside of the shielding cover 21, the high-voltage circuit substrate 23 is not always exposed to the X-rays generated by the X-ray tube 22, and it is possible to prevent the high-voltage circuit substrate 23 from deteriorating by the X-rays.

In the X-ray generator according to the present embodiment, the high-voltage circuit substrate 23 is attached to the shielding cover 21 via the insulating leg member 13, and is held at a position separated from the shielding cover 21 by a predetermined distance by the leg member 13, so that an insulation distance between the high-voltage circuit substrate 23 and the shielding cover 21 can be secured. Therefore, it is possible to prevent discharge between the high-voltage circuit substrate 23 and the shielding cover 21.

In the X-ray generator according to the present embodiment, since the shielding cover 21 and the X-ray tube 22 are attached to the lid body 24 that closes an upper surface of the housing 20, and the high-voltage circuit substrate 23 is attached to the outside of the shielding cover 21, a space for disposing the high-voltage circuit substrate 23 in the lid body 24 is not required, and the X-ray tube 22, the shielding cover 21, and the high-voltage circuit substrate 23 can be simultaneously taken out from or accommodated in the housing 20 in conjunction with attachment and detachment of the lid body 24 of the housing 20. Therefore, it is possible to improve maintainability of the X-ray generator 2.

For example, after performing wiring between the X-ray tube 22 and the high-voltage circuit substrate 23 at an outside of the housing 20, the lid body 24 is mounted on the housing 20, so that the wired X-ray tube 22 and the high-voltage circuit substrate 23 can be accommodated in the housing 20, together with the shielding cover 21. In this case, since the wiring can be performed at the outside of the housing 20, the wiring work is easy.

In the X-ray generator according to the present embodiment, since the high-voltage circuit substrate 23 is attached to the outer bottom surface 21*e* of the shielding cover 21 on a side opposite to the lid body 24 side, in the housing 20, there is no need for a space for disposing the high-voltage circuit substrate 23 on the outer side surfaces 21*c* and 21*d* of the shielding cover 21, which extend in a direction intersecting with the lid body 24, with the X-ray tube 22 interposed therebetween. Therefore, a dimension (width) of the housing 20 can be reduced in a direction orthogonal to a direction in which the X-rays are emitted from the X-ray tube 22.

As described above, the X-ray inspection apparatus according to the present embodiment can reduce a size and a weight of the X-ray generator 2, and thus can reduce a size and a weight of the X-ray inspection apparatus 1.

Modification Examples

In the present embodiment, although the example is described in which the high-voltage circuit substrate 23 and the shielding cover 21 are attached to each other via the leg member 13, the present disclosure is not limited to this. For example, as illustrated in FIG. 5, a configuration may be adopted in which an insulating plate-shaped member 15 is disposed between the high-voltage circuit substrate 23 and the shielding cover 21, and the high-voltage circuit substrate 23 is attached to the shielding cover 21 via the plate-shaped member 15.

The plate-shaped member 15 is made of, for example, a resin, is attached to the high-voltage circuit substrate 23 via four first leg members 16, and is attached to the outer bottom surface 21*e* of the shielding cover 21 via four second leg members 17. The first leg member 16 and the second leg member 17 are made of, for example, an insulating member such as a resin.

Figure 5:
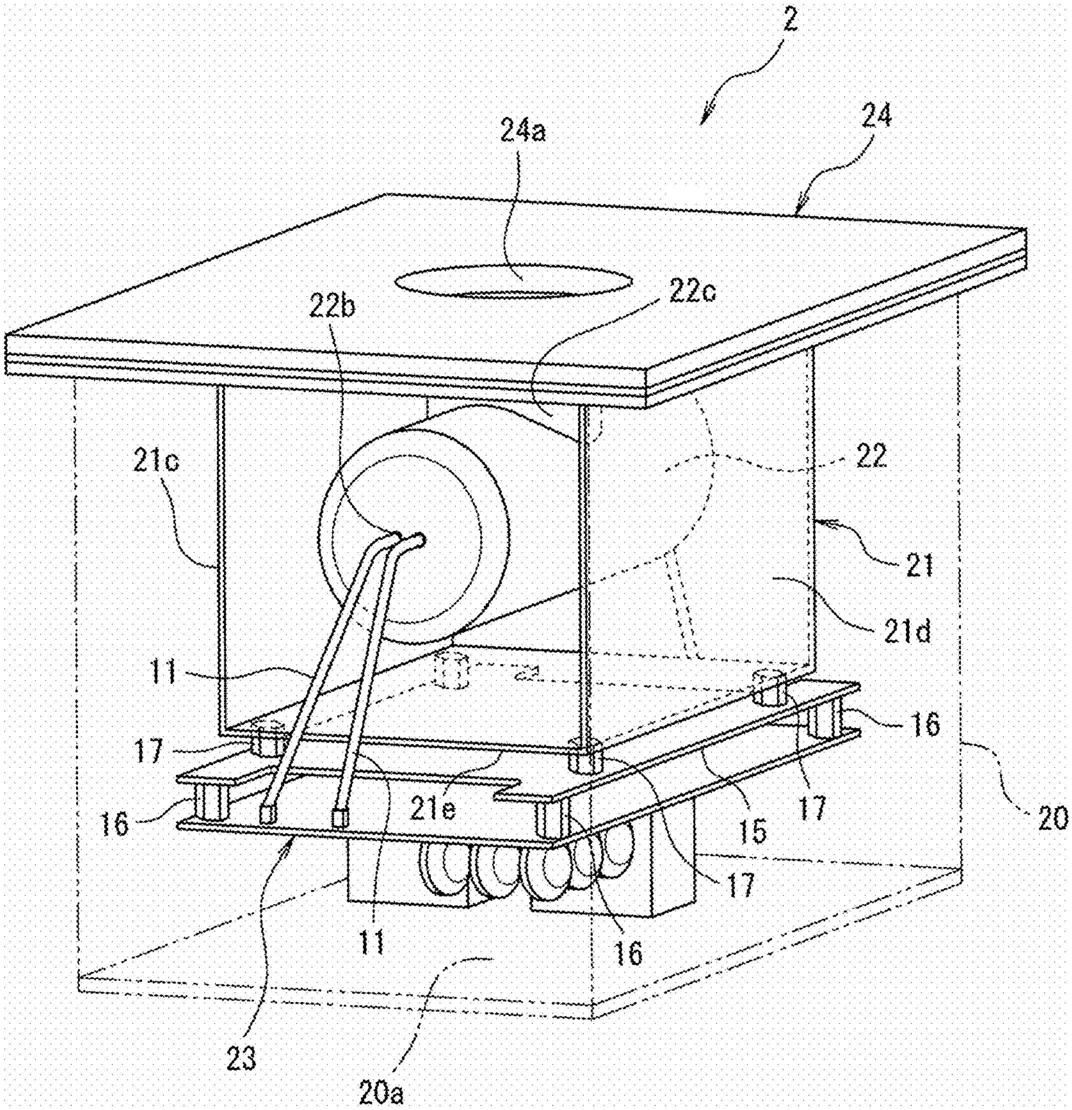
FIG. 5 is a transmission perspective-view illustrating a modification example of the X-ray generator according to the first embodiment of the present invention.

In the modification example illustrated in FIG. 5, since the high-voltage circuit substrate 23 is attached to the shielding cover 21 via the insulating plate-shaped member 15, which is disposed between the high-voltage circuit substrate 23 and the shielding cover 21, insulation between the high-voltage circuit substrate 23 and the shielding cover 21 can be further improved.

Further, since the first leg member 16 and the second leg member 17 are disposed at positions shifted from each other in a horizontal direction, that is, at positions that do not overlap with each other in an up-down direction, a creepage distance between the high-voltage circuit substrate 23 and the shielding cover 21 can be increased, and the insulation can be further improved.

In addition, in the present embodiment, the example is described in which the X-ray generator according to the present invention is applied to the X-ray generator 2 disposed to emit X-rays upward. Meanwhile, the present invention is not limited to this, and the X-ray generator according to the present invention may be applied to, for example, an X-ray generator disposed to emit X-rays downward.

In addition, in the present embodiment, the example in which the X-ray generator according to the present invention is applied to the X-ray generator used in the X-ray inspection apparatus having a type in which the X-ray generator 2 and the X-ray detector 3 are disposed to face each other in the up-down direction with a transport path of the inspection target object W interposed therebetween is described. Meanwhile, the present invention is not limited to this, and the X-ray generator according to the present invention may be applied to an X-ray generator used in, for example, a trans-illumination type X-ray inspection apparatus in which the X-ray generator 2 and the X-ray detector 3 are disposed to face each other in a horizontal direction orthogonal to a transport direction of the inspection target object W with the transport path of the inspection target object W interposed therebetween.

Second Embodiment

Next, an X-ray generator according to a second embodiment of the present invention will be described with reference to FIGS. 6 to 8.

The present embodiment is different from the first embodiment in that an attachment position of the high-voltage circuit substrate 23 and a shape of the housing 20 are different in the X-ray generator provided in the X-ray inspection apparatus 1, and the other configurations are the same as those of the first embodiment. Hereinafter, the same configurations as those in the first embodiment will be designated by the same reference numerals, and the description thereof will be omitted.

Figure 6:
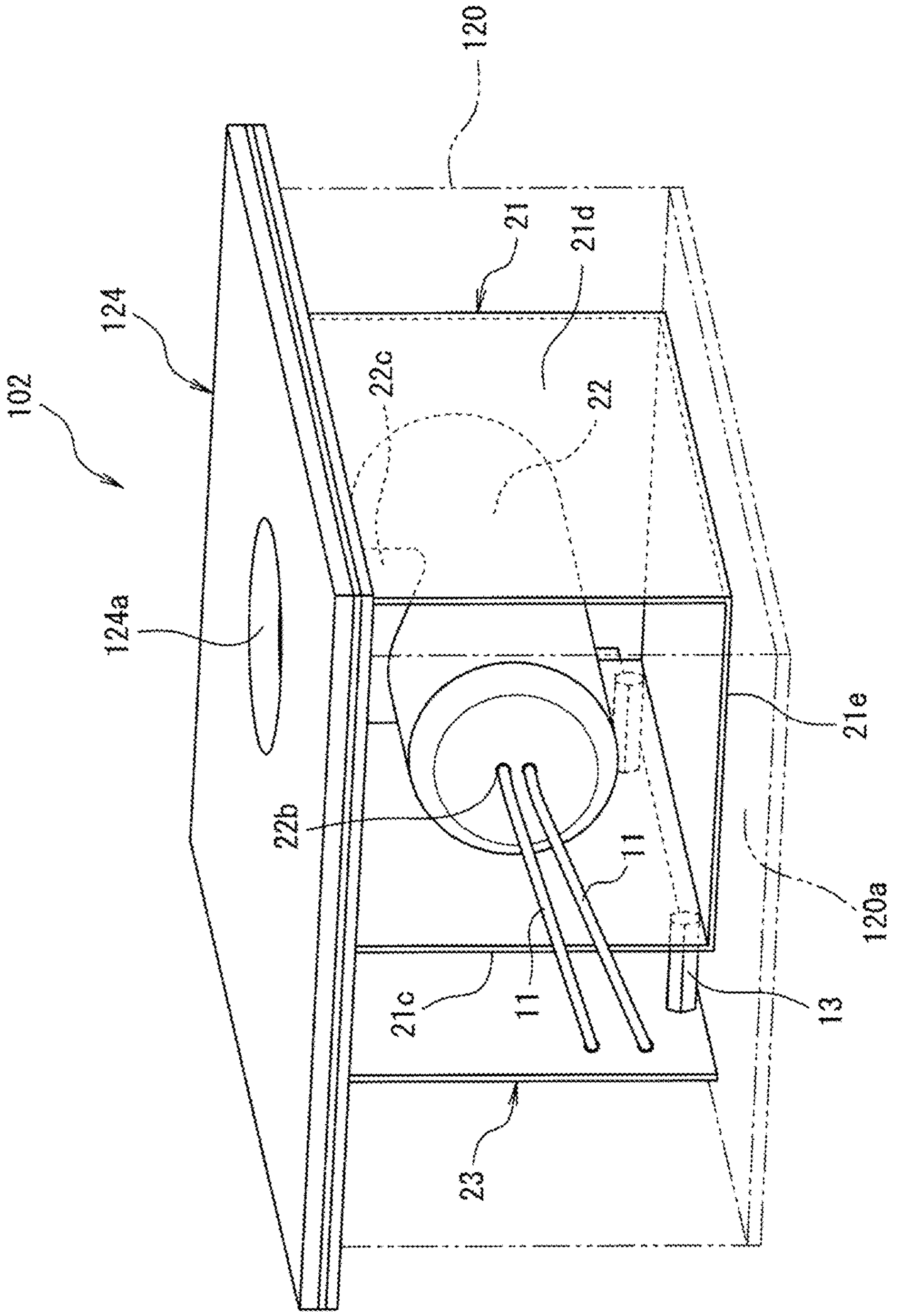
FIG. 6 is a transmission perspective-view of an X-ray generator according to a second embodiment of the present invention.

As illustrated in FIG. 6, an X-ray generator 102 according to the present embodiment includes a housing 120, the shielding cover 21, the X-ray tube 22, the high-voltage circuit substrate 23, and a lid body 124.

The housing 120 according to the present embodiment has a different shape from the housing 20 according to the first embodiment, and other configurations are the same. The housing 120 is formed to have a smaller dimension in a height direction (up-down direction) than the housing 20 of the first embodiment, and to have a larger dimension in a direction orthogonal to the up-down direction and an axial direction of the X-ray tube 22 (in FIG. 8, a forward-rearward direction, which is a right-left direction).

With this, the lid body 124 according to the present embodiment is formed to have a larger dimension in the direction orthogonal to the up-down direction and the axial direction of the X-ray tube 22 (in FIG. 8, the forward-rearward direction, which is the right-left direction) than the lid body 24 according to the first embodiment. In addition, the X-ray window portion 124*a* formed at the lid body 124 is disposed at a position biased from a center of the lid body 124 toward a front side (left side in FIG. 8) of the housing 120. This is because, in the housing 120 of the present embodiment, the shielding cover 21 is disposed to be biased toward the front side (left side in FIG. 8) of the housing 120 to secure a disposition space of the high-voltage circuit substrate 23.

In the present embodiment, an upper surface of the shielding cover 21 is bonded to a back surface of the lid body 124 by welding or a fastening member (not illustrated). Therefore, the shielding cover 21 is held by the lid body 124 in the housing 120 in a state in which the outer bottom surface 21*e* is spaced upward from the inner bottom surface 120*a* of the housing 120.

Figure 7:
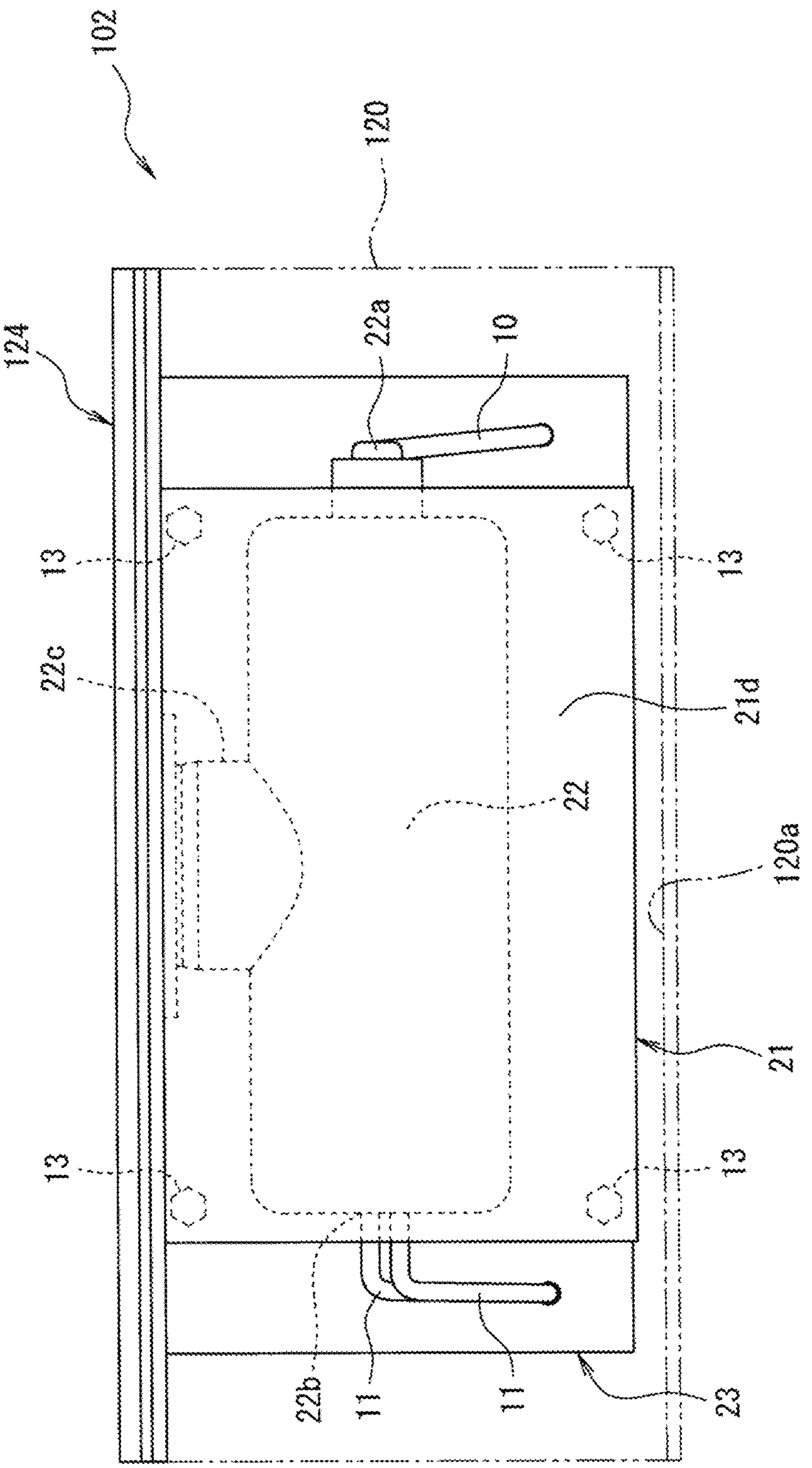
FIG. 7 is a transmission front view of the X-ray generator according to the second embodiment of the present invention.
Figure 8:
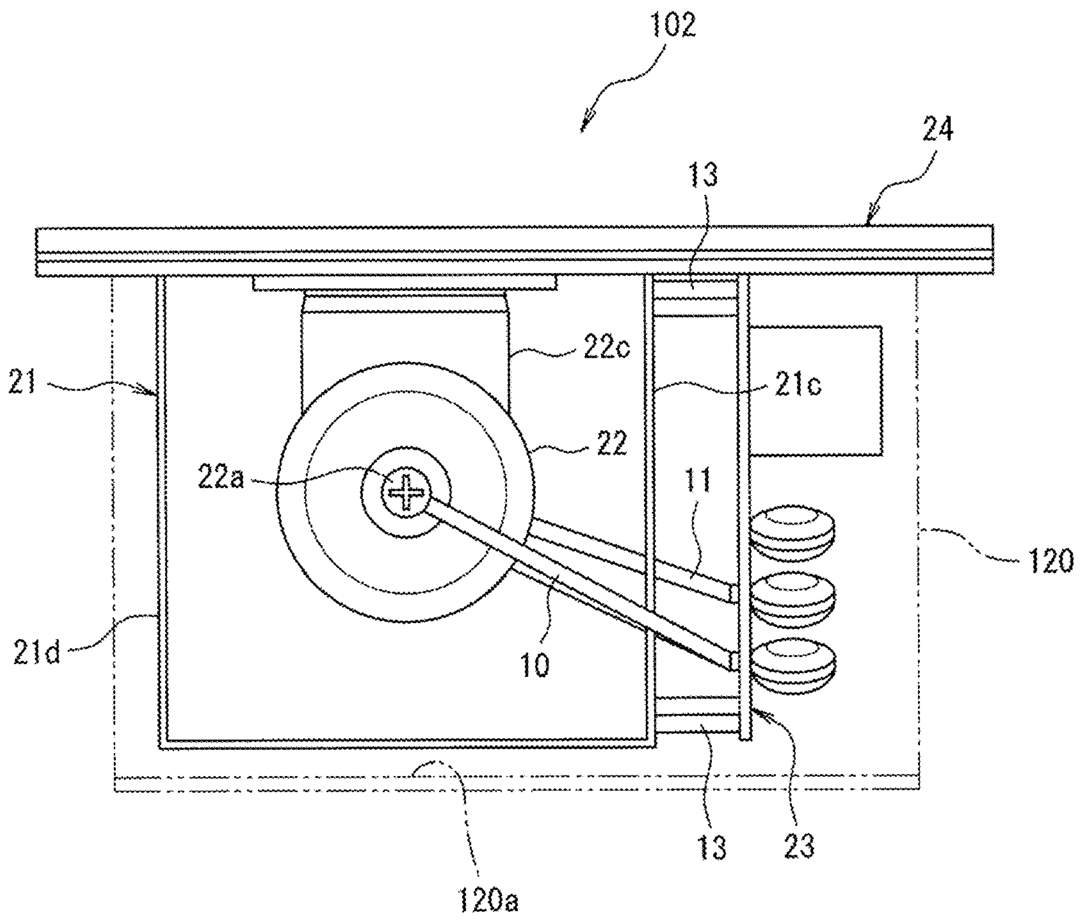
FIG. 8 is a transmission side view of the X-ray generator according to the second embodiment of the present invention.

As illustrated in FIGS. 7 and 8, in the present embodiment, the high-voltage circuit substrate 23 is attached to the outer side surface 21*c*, which constitutes one side surface of outer peripheral surfaces of the shielding cover 21, via four leg members 13. The high-voltage circuit substrate 23 may be attached to the outer side surface 21*d*.

The high-voltage circuit substrate 23 is held at a position laterally separated from the outer side surface 21*c* of the shielding cover 21 by a predetermined distance, by the four leg members 13.

It is desirable that a predetermined distance between the high-voltage circuit substrate 23 and the outer side surface 21*c* of the shielding cover 21 is a distance (including a creepage distance) at which insulation can be maintained between the high-voltage circuit substrate 23 and the shielding cover 21. Therefore, it is preferable that a length of the leg member 13 in the axial direction of the present embodiment is set to a dimension corresponding to the distance at which the insulation described above can be maintained.

In addition, it is desirable that the high-voltage circuit substrate 23 is held in the housing 120 at a position at which the high-voltage circuit substrate 23 can maintain insulation with the housing 120. Therefore, in the present embodiment, it is preferable that a dimension of the housing 120 is set such that a distance between the housing 120 and the high-voltage circuit substrate 23 is a distance at which the insulation can be maintained.

Actions and Effects

In this manner, in the X-ray generator according to the present embodiment, since the shielding cover 21 consisting of the shielding material that shields the X-rays is provided in the housing 120, the X-ray tube 22 is disposed in the shielding cover 21, and the high-voltage circuit substrate 23 is attached to the outside of the shielding cover 21, the high-voltage circuit substrate 23 can be efficiently disposed in the housing 120. In addition, by shielding the periphery of the X-ray tube 22 with the shielding cover 21, a weight of a shielding material on an inner surface of the housing can also be reduced. Therefore, it is possible to reduce a size and a weight of the X-ray generator 102.

Further, in the X-ray generator according to the present embodiment, since the high-voltage circuit substrate 23 is provided on the outside of the shielding cover 21, the high-voltage circuit substrate 23 is not always exposed to the X-rays generated by the X-ray tube 22, and it is possible to prevent the high-voltage circuit substrate 23 from deteriorating by the X-rays.

In the X-ray generator according to the present embodiment, the high-voltage circuit substrate 23 is attached to the shielding cover 21 via the insulating leg member 13, and is held at a position separated from the shielding cover 21 by a predetermined distance by the leg member 13, so that an insulation distance between the high-voltage circuit substrate 23 and the shielding cover 21 can be secured. Therefore, it is possible to prevent discharge between the high-voltage circuit substrate 23 and the shielding cover 21.

In the X-ray generator according to the present embodiment, since the shielding cover 21 and the X-ray tube 22 are attached to the lid body 124 that closes an upper surface of the housing 120, and the high-voltage circuit substrate 23 is attached to the outside of the shielding cover 21, a space for disposing the high-voltage circuit substrate 23 in the lid body 124 is not required, and the X-ray tube 22, the shielding cover 21, and the high-voltage circuit substrate 23 can be simultaneously taken out from or accommodated in the housing 120 in conjunction with attachment and detachment of the lid body 124 of the housing 120. Therefore, it is possible to improve maintainability of the X-ray generator 102.

For example, after performing wiring between the X-ray tube 22 and the high-voltage circuit substrate 23 at an outside of the housing 120, the lid body 124 is mounted on the housing 120, so that the wired X-ray tube 22 and the high-voltage circuit substrate 23 can be accommodated in the housing 120, together with the shielding cover 21.

In this case, since the wiring can be performed at the outside of the housing 120, the wiring work is easy.

In the X-ray generator according to the present embodiment, since the high-voltage circuit substrate 23 is attached to the outer side surface 21*c* of the shielding cover 21, a space for disposing the high-voltage circuit substrate 23 on the outer bottom surface 21*e* of the shielding cover 21 on a side opposite to the lid body 124 side in the housing 120 is not required. Therefore, a dimension (height) of the housing 120 can be reduced in a direction in which the X-rays are emitted from the X-ray tube 22.

In the present embodiment as well, it is possible to reduce a size of a weight of the X-ray generator 102, so that it is possible to reduce a size and a weight of the X-ray inspection apparatus 1 including the X-ray generator 102.

Modification Examples

Figure 9:
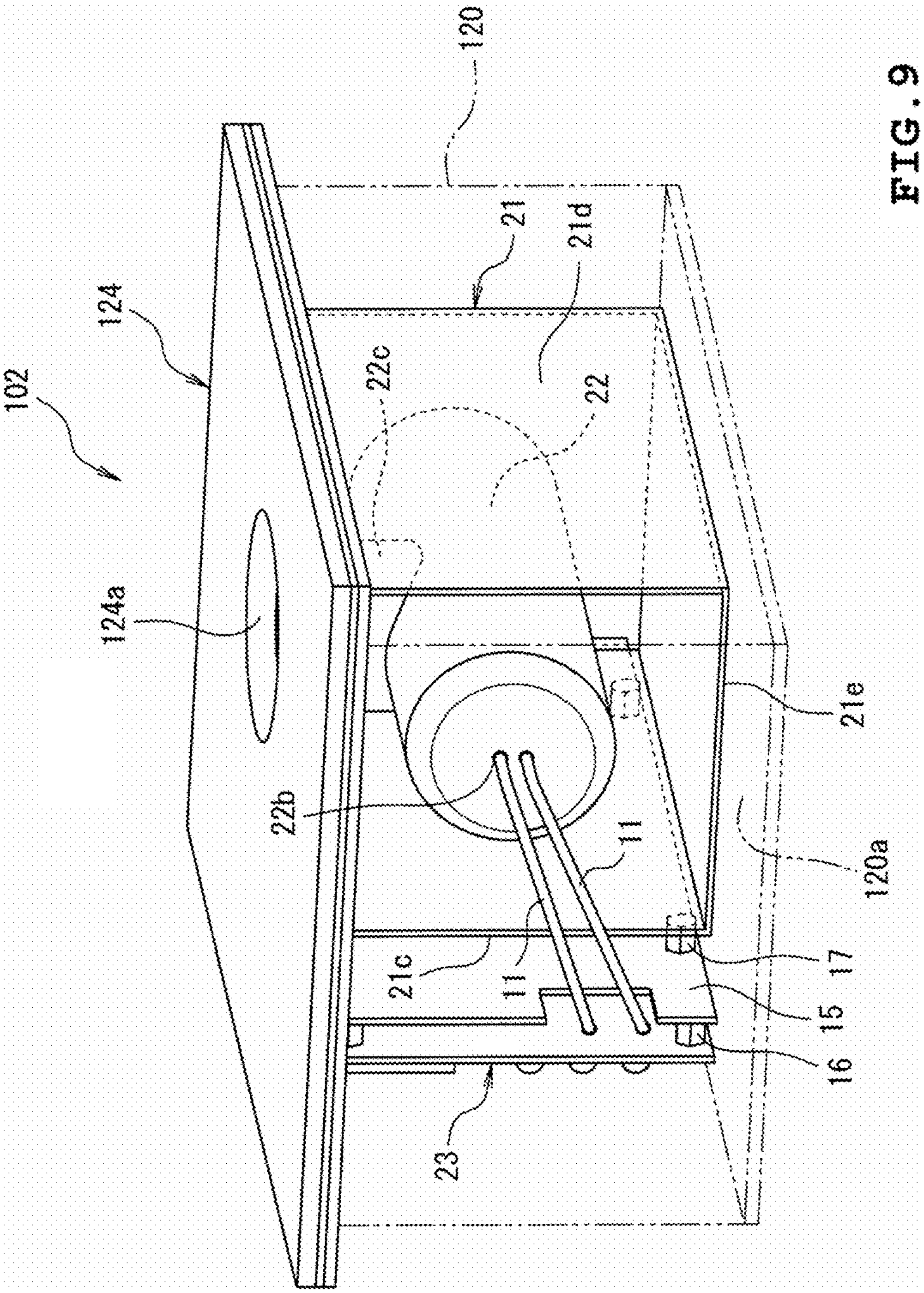
FIG. 9 is a transmission perspective-view illustrating a modification example of the X-ray generator according to the second embodiment of the present invention.

In the present embodiment as well, for example, as illustrated in FIG. 9, a configuration may be adopted in which the insulating plate-shaped member 15 is disposed between the high-voltage circuit substrate 23 and the shielding cover 21, and the high-voltage circuit substrate 23 is attached to the shielding cover 21 via the plate-shaped member 15.

The plate-shaped member 15 is made of, for example, a resin, is attached to the high-voltage circuit substrate 23 via the four first leg members 16, and is attached to the outer side surface 21*c* of the shielding cover 21 via the four second leg members 17. The first leg member 16 and the second leg member 17 are made of, for example, an insulating member such as a resin.

In the modification example illustrated in FIG. 9, since the high-voltage circuit substrate 23 is attached to the shielding cover 21 via the insulating plate-shaped member 15, which is disposed between the high-voltage circuit substrate 23 and the shielding cover 21, insulation between the high-voltage circuit substrate 23 and the shielding cover 21 can be further improved.

Further, since the first leg member 16 and the second leg member 17 are disposed at positions shifted from each other in a vertical plane direction, that is, at positions that do not overlap with each other in a forward-rearward direction, a creepage distance between the high-voltage circuit substrate 23 and the shielding cover 21 can be increased, and the insulation can be further improved.

Hitherto, the embodiments of the present invention have been disclosed, but it is clear that changes can be made by those skilled in the art without departing from the scope of the present invention. All such modifications and equivalents are intended to be included in the following claims.

DESCRIPTION OF REFERENCE NUMERALS AND SIGNS

1: X-ray inspection apparatus
2, 102: X-ray generator
3: X-ray detector
13: Leg member
15: Plate-shaped member
16: First leg member
17: Second leg member
20, 120: Housing
20*a*, 120*a*: Inner bottom surface
21: Shielding cover
21*c*: Outer side surface (outer peripheral surface)
21*e*: Outer bottom surface (outer surface)
22: X-ray tube
23: High-voltage circuit substrate
24, 124: Lid body
24*a*, 124*a*: X-ray window portion
W: Inspection target object

What is claimed is:

1. An X-ray generator comprising:

an X-ray tube that generates X-rays;

a high-voltage circuit substrate that applies a high voltage to the X-ray tube; and a housing which is filled with an insulating oil and in which the X-ray tube and the high-voltage circuit substrate are accommodated, wherein a shielding cover made of a shielding material which shields the X-rays is provided in the housing, wherein the X-ray tube is disposed in the shielding cover, wherein the high-voltage circuit substrate is attached to an outside of the shielding cover, and wherein the high-voltage circuit substrate is attached to the shielding cover via an insulating leg member, and is held at a position separated from the shielding cover by a predetermined distance, by the insulating leg member.

2. The X-ray generator according to claim 1, wherein the housing has one side surface which is open, and has a lid body which closes an opening of the one side surface, the lid body is formed with an X-ray window portion through which the X-rays generated by the X-ray tube pass, and the shielding cover and the X-ray tube are attached to the lid body.

3. The X-ray generator according to claim 2, wherein the high-voltage circuit substrate is attached to an outer surface of the shielding cover, on a side opposite to a lid body side.

4. The X-ray generator according to claim 2, wherein the high-voltage circuit substrate is attached to an outer peripheral surface of the shielding cover, which extends in a direction intersecting with the lid body.

5. The X-ray generator according to claim 1, wherein an insulating plate-shaped member is disposed between the high-voltage circuit substrate and the shielding cover, and the high-voltage circuit substrate is attached to the shielding cover via the plate-shaped member.

6. The X-ray generator according to claim 2, wherein an insulating plate-shaped member is disposed between the high-voltage circuit substrate and the shielding cover, and the high-voltage circuit substrate is attached to the shielding cover via the plate-shaped member.

7. An X-ray inspection apparatus comprising:

the X-ray generator according to claim 1; and an X-ray detector that detects the X-rays.

8. An X-ray inspection apparatus comprising:

the X-ray generator according to claim 2; and an X-ray detector that detects the X-rays.

9. An X-ray generator comprising:

an X-ray tube that generates X-rays;

a high-voltage circuit substrate that applies a high voltage to the X-ray tube; and a housing which is filled with an insulating oil and in which the X-ray tube and the high-voltage circuit substrate are accommodated, wherein a shielding cover made of a shielding material which shields the X-rays is provided in the housing, wherein the X-ray tube is disposed in the shielding cover, wherein the high-voltage circuit substrate is attached to an outside of the shielding cover, wherein the housing has one side surface which is open, and has a lid body which closes an opening of the one side surface, wherein the lid body is formed with an X-ray window portion through which the X-rays generated by the X-ray tube pass, and wherein the shielding cover and the X-ray tube are attached to the lid body.

10. The X-ray generator according to claim 9, wherein the high-voltage circuit substrate is attached to an outer surface of the shielding cover, on a side opposite to a lid body side.

11. The X-ray generator according to claim 9, wherein the high-voltage circuit substrate is attached to an outer peripheral surface of the shielding cover, which extends in a direction intersecting with the lid body.

12. The X-ray generator according to claim 9, wherein an insulating plate-shaped member is disposed between the high-voltage circuit substrate and the shielding cover, and the high-voltage circuit substrate is attached to the shielding cover via the plate-shaped member.

13. An X-ray inspection apparatus comprising:

the x-ray generator according to claim 9; and an X-ray detector that detects the X-rays.

* * * * *